| United States Patent [19] | [11] 4,028,117 |
|---|---|
| Moat | [45] June 7, 1977 |

[54] CORROSION INHIBITORS

[75] Inventor: Nicholas Warrington Moat, Hawley, England

[73] Assignee: Edwin Cooper & Company Limited, Bracknell, England

[22] Filed: May 29, 1975

[21] Appl. No.: 581,744

[30] Foreign Application Priority Data

May 30, 1974 United Kingdom ............. 23986/74

[52] U.S. Cl. .................................. 106/14; 106/267; 106/285; 252/393; 252/396
[51] Int. Cl.$^2$ .......................................... C09D 5/08
[58] Field of Search ............ 106/14, 243, 285, 267; 252/388, 393, 396

[56] References Cited

UNITED STATES PATENTS

| 2,631,979 | 3/1953 | McDermott ......................... 106/14 |
| 2,632,695 | 3/1953 | Landis et al. ........................... 44/66 |
| 2,822,330 | 2/1958 | Riggs et al. ......................... 252/388 |
| 3,696,048 | 10/1972 | Hausler et al. ..................... 252/392 |

*Primary Examiner*—Lorenzo B. Hayes
*Attorney, Agent, or Firm*—Donald L. Johnson; Robert A. Linn; Joseph D. Odenweller

[57] ABSTRACT

A corrosion inhibitor, particularly suitable for use in pipelines used for the transportation of hydrocarbon fluids such as crude petroleum or refined petroleum fractions, comprises a mixture of (a) from 1.8 to 25 parts by weight dimerised unsaturated fatty acid and (b) 1 part by weight of an alkoxylated alkyl phenol and provides a WSIM number (as defined) of at least 60.

8 Claims, No Drawings

CORROSION INHIBITORS

This invention relates to corrosion inhibitors, particularly but not exclusively to corrosion inhibitors for use in pipelines used for the transportation of hydrocarbon fluids such as crude petroleum or refined petroleum fractions such as kerosene, aviation fuel or fuel oils, e.g. for domestic heating purposes.

In the commercial transportation by pipeline of crude petroleum and/or refined products thereof it is common practice to employ a corrosion inhibitor. This is commonly injected into the liquid being transported in the pipeline and is carried along by the liquid and evenly distributed throughout the pipeline downstream of the point of injection.

Phosphorous containing inhibitors often used in pipelines have recently become unacceptable to pipeline operations and the development of improved inhibitors has therefore become desirable. For instance in U.S. Pat. No. 2,334,153 combinations of polycarboxylic acids having at least 16 carbon atoms in a mutual solvent such as an alkylene glycol mono alkyl ether have been proposed as corrosion inhibitors for flushing oils but these additives have been found to be ineffective at the low concentrations necessarily used in fuels. Furthermore in U.S. Pat. No. 3,696,048 it has been suggested to use as corrosion inhibitors combinations of aliphatic amine salts of $C_{10-50}$ dimer acids and particular alkoxylated alkyl phenols but when tested for water separability characteristics in kerosene these additives have been found to provide unacceptably low WSIM numbers (as hereinafter defined) falling below 50 and in some cases below 30.

We have now found a mixture of substances which exhibit particularly desirable corrosion inhibiting properties whilst combining excellent water separability characteristics.

Accordingly the present invention provides a mixture suitable for use as a corrosion inhibitor, which mixture comprises (a) from 1.8 to 25 parts by weight dimerised unsaturated fatty acid, and (b) 1 part by weight of an alkoxylated alkyl phenol, and provides a WSIM number as hereinafter defined of at least 60.

The WSIM (Water Separation Index, Modified) number is a numerical rating indicating the ease of separating water from a hydrocarbon liquid by coalescence. As used herein the term WSIM number means that rating as determined at a concentration of 24 p.p.m. inhibitor by the method as defined in the ASTM Specification D-2550 except in that kerosene is used as the Reference Fluid Base. It is to be understood that the disclosure of ASTM Specification D-2550 is accordingly imported herein by reference.

The dimerised unsaturated fatty acid component is preferably a dimer of a comparatively long chain fatty acid, e.g. containing from 8 to 20 carbon atoms, and may be pure, or substantially pure, dimer. Alternatively, and preferably, the material sold commercially and known as "dimer acid" may be used. This latter material is prepared by dimerising unsaturated fatty acid and consists of a mixture of monomer, dimer and trimer of the acid. A particularly preferred dimer acid is the dimer of linoleic acid available commercially under such trade names as Empol 1022.

The second component of the inhibitor of the present invention is an alkoxylated alkyl phenol which in conjunction with the dimerised unsaturated fatty acid, and at the relative molar ratio of the components used, provides an inhibitor of WSIM number of at least 60, and preferably at least 70, more preferably at least 80. Alkoxylated alkyl phenols which have been found to be particularly useful in this respect are alkoxylated, especially ethoxylated, alkyl phenols having an average of from 1 to 8, preferably 3 or 4, alkylene oxide residues per molecule. The most preferred examples of such materials are alkoxylated p-alkyl phenols in which the alkyl group contains from 4 to 16 carbon atoms, for example alkoxylated p-octyl, p-nonyl or p-dodecyl phenol, or alkoxylated phenols containing more than one alkyl group in which the alkyl groups contain a total of from 4 to 16 carbon atoms. Such materials are available under such trade names as Sterox NA, Sterox NB, Sterox NC and Sterox ND.

The inhibitors of the present invention preferably contain from 2 to 15 parts by weight, more preferably 2 to 9, and most preferably 2 to 5, particularly about 3, parts by weight of the dimerised unsaturated fatty acid component per 1 part by weight of the alkoxylated alkyl phenol. The inhibitor may be used, for example, in a concentration of up to 12lbs per 1,000 barrels of hydrocarbon fluid, preferably from about 1 to 3½lbs per 1,000 barrels, more preferably from about 1½ to 3lbs per 1,000 barrels. (Note: 3lbs per 1,000 barrels is equivalent to 10 p.p.m.). It is often convenient however to utilise the inhibitors in the form of a concentrate solution in a diluent process oil. Such concentrates may contain, for example, from 50 to 70% by weight of the inhibitor, based on the total weight of the concentrate.

Accordingly the present invention also includes as a further aspect a solution of the inhibitor in a hydrocarbon solvent, the inhibitor being present in an at least corrosion-inhibiting amount, i.e. at least 1 lb per 1,000 barrels solvent. In yet another aspect of the present invention there is provided a method of inhibiting corrosion in pipelines used for the transportation of hydrocarbon fluids which method comprises injecting into the liquid being transported a corrosion inhibiting amount of a corrosion inhibitor in accordance with the invention.

The present invention will now be illustrated with reference to the following Examples:

EXAMPLE 1

A concentrate was formed from the following ingredients in the stated proportions by weight:

| | |
|---|---|
| Dimer Acid (Empol 1022) | 45% |
| Sterox ND | 15% |
| Process Oil | 10% |
| Kerosene | 30% |

The process oil used in the above concentrate was a 100 solvent Neutral high V.I. (about 92) mineral oil having viscosities of about 22 and 4 cSt at 100° F and 210° F respectively. The kerosene was a distillate of final boiling point 257° C and Specific Gravity at 60° F of about 0.78.

The concentrate was subjected to duplicate Rust Tests according to the MIL-I-25017c specification at a concentration of 3lb/thousand barrels and passed in each case.

The concentrate was also tested for water separability characteristics in various commercially available fuels at a concentration of 12lbs per 1,000 barrels (i.e.

40 p.p.m. of concentrate, equivalent to 24 p.p.m. of inhibitor), with the following results:

| Fuel | WSIM No |
|---|---|
| 85% Bayol R-34 | 86/76/82* |
| Clay percolated Jet A | 96/91* |
| Chevron Jet A50 | 83 |
| Shell Odorless Kerosene (Distillate boiling range: 205–259° C Specific Gravity at 60° F : 0.818) | 80 |

*Results obtained in duplicate tests.

To demonstrate the effect of varying the alkoxylated alkyl phenol and ratio of dimer acid to alkoxylated alkyl phenol, further concentrates were prepared and subjected to rust and water separability tests in a similar manner to Example 1, salient details of the concentrates tested and of the results obtained being summarised in Table 1. In Table 1, it should be noted that example numbers have been allocated only to concentrates in accordance with the claimed invention, concentrates not allocated a number having been included for comparison purposes only.

TABLE 1

| | Ethoxylated Alkyl Phenol | | | Mil-I-25017c Rust-Test and WSIM Results | | | |
|---|---|---|---|---|---|---|---|
| | | | | Rust Test[B] | | | |
| Example No. | Alkyl substituent | No. of ethoxy groups | Ratio DA[A] to ethoxylated alkyl phenol | Concentration of DA[A] (ppm) | Concentration of ethoxylated alkyl phenol | Result | WSIM[C] No. |
| | — | — | — | nil | nil | 1 Fail | 100[D] |
| | — | — | — | 4.5 | nil | 2 Fails | |
| | — | — | — | 6.0 | nil | 3 Fails | 81 |
| | nonyl | 4 | — | nil | 20 | 1 Fail | |
| 2 | nonyl | 4 | 23:1 | 5.75 | 0.25 | 1 Pass | |
| 3 | nonyl | 4 | 11:1 | 5.5 | 0.5 | 3 Passes 1 Fail | 89 |
| 4 | nonyl | 4 | 3:1 | 4.5 | 1.5 | 7 Passes 1 Fail | 85 |
| 5 | nonyl | 4 | 2:1 | 4.0 | 2.0 | 3 Passes 2 Fails | |
| | nonyl | 4 | 1.45:1 | 5.8 | 4.0 | 1 Fail | |
| | nonyl | 4 | 1:1 | 5.0 | 5.0 | 1 Fail | |
| | nonyl | 4 | 0.5:1 | 4.7 | 9.4 | 1 Fail | |
| 6 | tributyl | 4 | 3:1 | 4.5 | 1.5 | 1 Pass | 75 |

[A]Dimer acid Empol 1022
[B]Kerosene of final boiling point 257° C and Specific Gravity at 60° F of 0.78 used as solvent.
[C]At concentration of 24ppm inhibitor in Shell Odorless Kerosene of distillate range 205–259° C and specific gravity at 60° F of 0.818, as Reference Base Fluid.
[D]Pure Reference Base Fluid.

From the rust test results in Table 1, it is observed that dimer acid alone and alkoxylated alkyl phenol alone were ineffective and that a ratio of dimer acid to alkoxylated alkyl phenol of less than 1.8:1 was also ineffective.

To allow further comparison with previously known corrosion inhibitors in respect of water separability characteristics, WSIM values were also determined (at a concentration of 24 p.p.m. inhibitor) for concentrates containing various corrosion inhibitor combinations described in U.S. Pat. No. 3,696,048, the following results being obtained:

| 1:1 salt of Duomeen T* and | Empol 1022 Sterox ND kerosene+ | 45 parts 15 parts 40 parts | WSIM No 22 |
|---|---|---|---|
| Monododecylamine salt of | Empol 1022 Sterox ND | 45 parts 15 parts | WSIM |

| | kerosene+ | 40 parts | No 46 |
|---|---|---|---|
| Basic Duomeen O* salt of | Empol 1022 Sterox ND kerosene+ | 45 parts 15 parts 40 parts | WSIM No 16 |

*Duomeens are a commercially available range of diamines.
+Shell Odorless Kerosene of distillate range 205–259° C and specific gravity at 60° F of 0.818.

It is observed that the corrosion inhibitors of the present invention provide significantly improved WSIM numbers as compared with the materials described in U.S. Pat. No. 3,696,048.

I claim:

1. A mixture suitable for use as a corrosion inhibitor, which mixture comprises (a) from 1.8 to 25 parts by weight dimerised unsaturated fatty acid said fatty acid containing 8–20 carbon atoms and (b) 1 part by weight of an ethoxylated alkyl phenol, said phenol having an average of about 3–4 ethylene oxide units and said alkyl containing 4–16 carbon atoms and wherein said mixture provides a WSIM number of at least 60.

2. A mixture according to claim 1 wherein component (a) is the "dimer acid" derived from linoleic acid.

3. A mixture according to claim 2 wherein component (b) is an ethoxylated p-octyl, p-nonyl or p-dodecyl phenol.

4. A mixture according to claim 3 containing from 2 to 5 parts by weight of component (a) per a 1 part by weight of component (b).

5. A mixture according to claim 1 which provides a WSIM number of at least 80.

6. A mixture according to claim 1 dissolved in corrosion inhibiting amount in a hydrocarbon fluid.

7. A mixture according to claim 1 dissolved or dispersed in a diluent process oil in a concentration of from 50 to 70% by weight based on the total weight of the concentrate.

8. A method of inhibiting corrosion in pipelines used for the transportation of hydrocarbon fluids which method comprises injecting into the fluid being transported a corrosion inhibiting amount of a mixture according to claim 1.

* * * * *

UNITED STATES PATENT AND TRADEMARK OFFICE
CERTIFICATE OF CORRECTION

PATENT NO. : 4,028,117
DATED : June 7, 1977
INVENTOR(S) : Nicholas Warrington Moat It is certified that error appears in the above-identified patent and that said Letters Patent are hereby corrected as shown below:

Claim 4, line 2 - after "per" delete -- a --

Signed and Sealed this twenty-third Day of August 1977

[SEAL]

Attest:

RUTH C. MASON
Attesting Officer

C. MARSHALL DANN
Commissioner of Patents and Trademarks